Feb. 25, 1930.  C. SUNDSTROM ET AL  1,748,739
PROCESS FOR PRODUCING SODIUM SESQUICARBONATE
Filed April 8, 1926
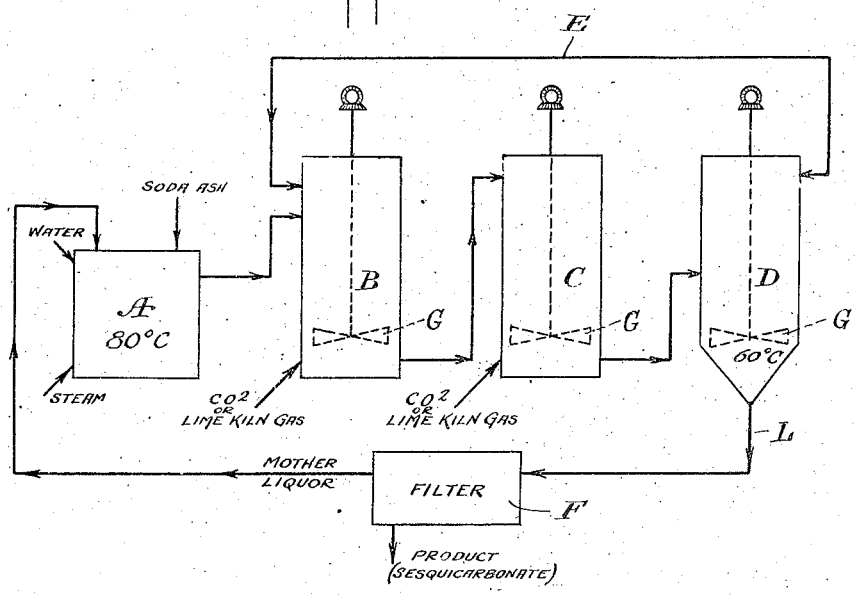
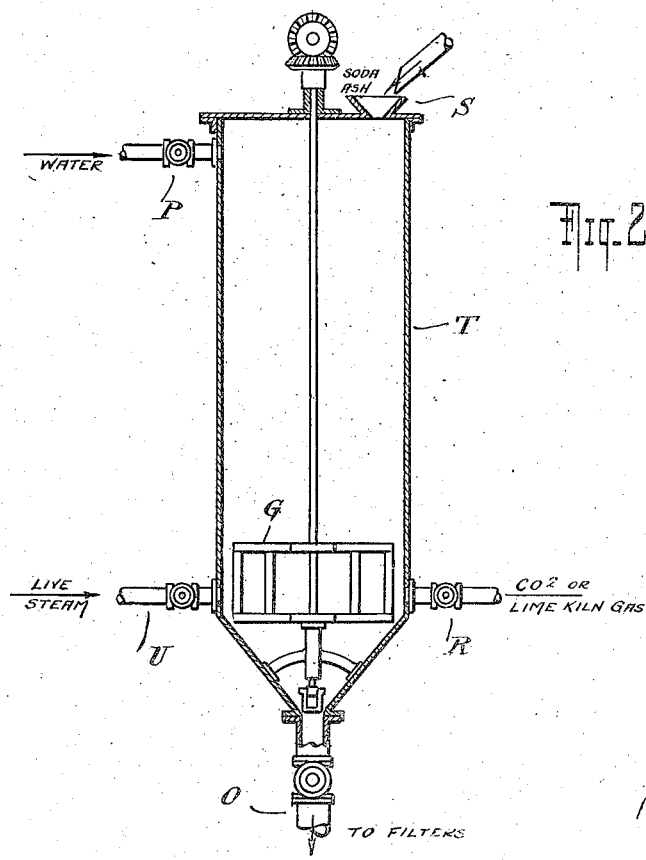
INVENTORS
CARL SUNDSTROM
GEORGE N. TERZIEV
BY
ATTORNEYS Patented Feb. 25, 1930

1,748,739

UNITED STATES PATENT OFFICE

CARL SUNDSTROM AND GEORGE N. TERZIEV, OF SYRACUSE, NEW YORK, ASSIGNORS TO THE SOLVAY PROCESS COMPANY, OF SOLVAY, NEW YORK, A CORPORATION OF NEW YORK

PROCESS FOR PRODUCING SODIUM SESQUICARBONATE

Application filed April 8, 1926. Serial No. 100,540.

This invention relates to a method of producing sodium salts, and more particularly to a process for the production of sodium sesquicarbonate.

The primary object of the present invention is to provide a process in which sodium sesquicarbonate of a desired size or density or crystalline structure is produced.

Another object of the invention is to provide a process capable of continuous operation, cyclic with respect to the production of sodium sesquicarbonate.

A further object is to provide a process for the manufacture of the aforesaid salt which can be carried out economically and with simple and inexpensive apparatus.

Apparatus in which the new process may be carried out is depicted in the accompanying drawings in which:—Fig. 1 is a diagrammatic view of apparatus arranged for continuous operation; Fig. 2 is an illustration of single unit apparatus.

Generally speaking, the present process contemplates conducting operations in such a manner that a large or dominant pool of a saturated solution of sodium sesquicarbonate is used as a vehicle to carry the reacting constituents and products thereof through the various stages of the process. After operations are under way sodium sesquicarbonate is precipitated, and such precipitate is maintained suspended continuously in the relatively large pool of solution. A portion of said suspension is withdrawn continuously and the precipitate filtered therefrom. The relation between the volume of said pool, the rate of addition of the raw constituents or materials, and the rate of withdrawal of suspension is such that precipitated sodium sesquicarbonate is maintained in said pool for a substantial length of time before it is withdrawn. By this procedure precipitated particles having a desired size or density or crystalline structure are produced.

A preferred mode of carrying the present invention into practice is to start with a solution saturated with respect to sesquicarbonate. This solution is an aqueous one in which the concentrations of sodium carbonate and sodium bicarbonate are such that sesquicarbonate of soda will not dissolve therein. Any suitable reaction vessel may be employed to hold the said solution. Sodium carbonate, sodium bicarbonate or the equivalent thereof, and water are continuously added to a large volume or pool of the aforesaid solution in amounts corresponding approximately to the composition of sesquicarbonate which may be represented as $Na_2CO_3.NaHCO_3.2H_2O$. In other words, the amounts of the reacting constituents added are in the proportion of about one mole of sodium carbonate, about one mole of sodium bicarbonate, and about two moles of water. The water may be conveniently added entirely or in part as steam to assist in maintaining the solution at a desired temperature of about 60° C. It is not necessary to maintain exactly this temperature. A temperature within the range from about 60° C. to 80° C. is, however, generally most satisfactory. It is to be noted, however, that above a certain temperature sesquicarbonate is not stable in the presence of solution and therefore that above this temperature the sesquicarbonate will not be formed, irrespective of the composition of the liquid medium and of the amounts of the reagents added to the pool of liquid. The liquor is heated in any suitable manner to maintain the desired temperature and is agitated to insure proper circulation and intermixing of all the constituents in said liquor. As the aforesaid operation continues, sesquicarbonate is precipitated and is permitted to remain in contact with the said liquor until it has acquired a desired size or density or crystalline structure. It has been found that the presence of common salt (sodium chloride) in the liquid reaction medium assists materially in the formation of the desired product. A portion of the reaction liquor is withdrawn from the reaction vessel continuously or from time to time, at a point removed from the point of introduction of the added material but always in such a manner as not to diminish the effective character of the remaining solution as a dominant pool. The withdrawn portion is filtered to remove the precipitate of sesquicarbonate, the filtrate being returned to the reaction vessel to complete the cycle. The relation between the rate of withdrawal of liquor and the total volume in the reaction vessel is such that the precipitate remains suspended in the liquor for a substantial period of time, whereby it acquires the desired density or crystalline structure.

The carbonate-bicarbonate content of the saturated solution will vary with its temperature and with its salt content, but for each temperature there is a definite range of and relationship between the carbonate, bicarbonate, and salt content of the solution. For a temperature of about 60° C. to 80° C. the following represents a suitable solution if salt is present:

$Na_2CO_3$____180–200 grams per liter of solution
$NaHCO_3$____45–70 grams per liter of solution
$NaCl$_____60+ grams per liter of solution The salt content of the solution should preferably not exceed 100 grams per liter, for above this concentration sodium chloride is precipitated with the sesquicarbonate. In cases where a small percentage of NaCl, equivalent to that imported into the pool with the carbonate, is not objectionable to the consumer of the sesquicarbonate product, the NaCl content need not be considered at all.

The foregoing process may be carried out in the system shown diagrammatically in Fig. 1. In that figure A designates a tank containing a saturated sesquicarbonate solution maintained at approximately 80° C. Soda ash and water are fed in proper proportion into the tank A. Some of the water may, if desired, be introduced as steam through the direct steam inlet, whereby heat for the desired temperature maintenance is simultaneously supplied. Waste soda ash containing bicarbonate of soda may also be added. The insoluble matter in the raw materials may be allowed to settle in tank A or at some point between tanks A and B. The tank B is provided with an agitator G. Limited amounts of $CO_2$ (or lime kiln gas containing about 40% $CO_2$ where lime kiln gas is available) are passed into tank B. From the bottom of tank B the product thereof is withdrawn to tank C which is similar to tank B and to which the balance of the required $CO_2$ is introduced. The liquor is transferred from the bottom of tank C to tank D which is similar to tank B except that it has no $CO_2$ gas inlet. The contents of tank D are subjected to gentle agitation. An overflow connection E is provided in tank D to permit the finer crystals in suspension in D to be returned to the system say at tank B for further growth, and only the relatively readily settable coarse crystals in D are withdrawn through line L to the centrifugal separator or filters F. There is permitted a temperature drop from 80° C. in tank A to 60° C. in tank D which latter temperature is constantly maintained in tank D. In the filters F a separation between the crystals and the mother liquor takes place, the crystals being withdrawn as product and the mother liquor being returned to tank A. Periodically after the NaCl concentration reaches somewhere between 90–100 grams per liter some of the mother liquor is purged from the system.

In the described method of carrying the present invention into practice the raw materials are added continuously. It is, however, possible to conduct the procedure by allotting certain periods for operations when conducted in sequence with respect to the addition of reacting materials. This sequence of operation may be, for example, as follows: add the requisite amounts of raw materials one after another with agitation, withdraw the product, and then return the filtrate to the system. This cycle may be repeated as often as desired. Due to the fact that water is one of the raw reaction materials, as well as a substantial constituent of the maintained pool solution, the addition of water does not require to be quite as regular as is the case with the carbonate or bicarbonate materials.

The cyclic procedure described hereinabove may be carried out in the apparatus shown in Figure 2. In this figure the letter T designates a closed tank, preferably with a conical bottom. The soda ash may be supplied to the tank through a spout S and water through inlet P. Direct steam is introduced into the tank through inlet U, and $CO_2$ gas through inlet R. In this example lime kiln gas containing about 40% $CO_2$ may be used in place of more concentrated $CO_2$. The tank is provided with an agitator G which tends to maintain a substantial uniform liquor composition and tends to maintain the finer crystals in suspension. At the beginning of operations, the tank is nearly full of liquor saturated with sesquicarbonate and containing sufficient NaCl to test 60 to 80 grams per liter. The temperature of the solution is brought up to 60 to 80° C. by the introduction of direct steam through inlet U. Soda ash is then supplied through spout S and lime kiln gas through inlet R. The coarser crystals of sodium sesquicarbonate which are too heavy to be kept in suspension by the agitator fall to the conical bottom of the tank. After a sufficient quantity of coarse crystals has accumulated in the bottom of the tank, a portion of the contents of the tank is withdrawn through a discharge outlet O to a filter (not shown). The filtrate (mother liquor) is returned to the tank T and the operations described heretofore are repeated. As already stated, in conducting our process the soda ash and the $CO_2$ are added in quantities such that the composition of the solution is maintained within predetermined limits. A satisfactory specific composition for the solution is indicated, for example, by the following:

Na$_2$CO$_3$ ---------------- 196 grams per liter
NaHCO$_3$ ---------------- 66 grams per liter
NaCl ---------------- 71 grams per liter It will be observed from the foregoing description that the present invention provides a process which is easy to operate and to control. The apparatus used to carry out the process is simple and inexpensive, so that costly and complicated apparatus, such as vacuum evaporation, etc., used heretofore, are eliminated.

By the term "density" herein used, we mean the weight of a given volume of the product compared with the weight of an equal volume of water, i. e. density refers to the product as an aggregation of the particles constituting the product and not to the density of the individual particle or crystal. The term "size" as used in the present specification and claims refers to any of the well-known screen tests for determining the size of particles. In the specification and claims the term "crystalline structure" refers to the general form and size of the crystal particles of the product, and not to the particular crystal order or class to which the product belongs, as this will always be the same. Sodium sesquicarbonate crystallizes in needles. These needles, however, as formed under manufacturing conditions, may vary in length and cross section; they may be broken or fractured, or they may be in part the result of coalescence of individual needles. This variation in the "form" and "size" of the individual crystal particles in turn affects those properties of the product which determine its market value, such as density, general appearance, freedom of flow from a package, etc.

We claim:

1. The process for the production of sodium sesquicarbonate which comprises continuously maintaining a relatively large pool of a suspension of the sesquicarbonate, introducing to said pool sodium carbonate, water, and material equivalent to sodium bicarbonate, in amounts not substantially exceeding their combining proportions with respect to the composition of sodium sesquicarbonate, and affording said added materials opportunity to cause formation of a precipitate of sodium sesquicarbonate in the pool, withdrawing from the pool a part of the suspension containing the resulting precipitated sesquicarbonate, and then separating the precipitate therefrom, the relation between the volume of the pool and the volume of the withdrawals of the suspension being such as to hold precipitated sesquicarbonate suspended in the pool for a substantial length of time before it is withdrawn.

2. The process for the continuous production of sodium sesquicarbonate which comprises the continuous maintenance of a relatively large pool of a suspension of the sesquicarbonate, the relatively continuous addition to said pool of sodium carbonate, water, and material equivalent to sodium bicarbonate, in amounts corresponding to the composition of sodium sesquicarbonate, and relatively continuous withdrawal, at a point removed from the point of introduction of the added material, of suspension containing the resulting precipitated sesquicarbonate, the relation between the volume of the pool, rate of addition of added material, and rate of withdrawal of the suspension being such that the precipitated sesquicarbonate is maintained suspended in the pool for a substantial length of time before it is withdrawn.

3. The process for the continuous production of sodium sesquicarbonate which comprises the continuous maintenance of a relatively large pool of a suspension of the sesquicarbonate containing dissolved salt, the relatively continuous addition to said pool of sodium carbonate, water, and material equivalent to sodium bicarbonate in amounts corresponding to the composition of sodium sesquicarbonate, relatively continuous withdrawal, at a point removed from the point of introduction of the added material, of suspension containing the resulting precipitated sesquicarbonate, the relation between the volume of the pool, rate of addition of added material, and rate of withdrawal of the suspension being such that the precipitated sesquicarbonate is maintained suspended in the pool for a substantial length of time before it is withdrawn.

4. The process for the continuous production of sodium sesquicarbonate which comprises the continuous maintenance of a relatively large pool of a suspension of the sesquicarbonate, the relatively continuous addition to said pool of sodium carbonate, water, and material equivalent to sodium bicarbonate in amounts corresponding to the composition of sodium sesquicarbonate, relatively continuous withdrawal, at a point removed from the point of introduction of the added material, of suspension containing the resulting precipitated sesquicarbonate, the relation between the volume of the pool, rate of addition of added material, and rate of withdrawal of the suspension being such that the precipitated sesquicarbonate is maintained suspended in the pool for a substantial length of time before it is withdrawn, and, throughout the operation, maintaining in the pool an amount of salt in solution appropriate to the temperature and to the carbonate-bicarbonate content of the pool at any given time, the temperature of the pool being maintained at an approximately constant degree.

The process for the continuous production of sodium sesquicarbonate which comprises the continuous maintenance of a relatively large pool of a suspension of sesquicarbonate, the relatively continuous addition to said pool of sodium carbonate, water, and material equivalent to sodium bicarbonate, in amounts corresponding to the composition of sodium sesquicarbonate, relatively continuous withdrawal, at a point removed from the point of introduction of the added material, of suspension containing the resulting precipitated sesquicarbonate, the relation between the volume of the pool, rate of addition and added material, and rate of withdrawal of the suspension being such that the precipitated sesquicarbonate is maintained suspended in the pool for a substantial length of time before it is withdrawn, and filtering the withdrawn suspension and returning the filtrate to the pool.

6. The process for the continuous production of sodium sesquicarbonate which comprises the continuous maintenance of a relatively large pool of a suspension of the sesquicarbonate, the relatively continuous addition to said pool of sodium carbonate, water, and material equivalent to sodium bicarbonate, in amounts corresponding to the composition of sodium sesquicarbonate, relatively continuous withdrawal, at a point removed from the point of introduction of the added material, of suspension containing the resulting precipitated sesquicarbonate, the relation between the volume of the pool, rate of addition of added material, and rate of withdrawal of the suspension being such that the precipitated sesquicarbonate is maintained suspended in the pool for a substantial length of time before it is withdrawn, and agitating the pool throughout the entire operation.

7. The process for the continuous production of sodium sesquicarbonate which comprises establishing a main body composed of a solution saturated with respect to sodium sesquicarbonate as a vehicle for the production of said substance, adding, in a substantially continuous manner, and in proportions corresponding to the composition of sodium sesquicarbonate, materials capable of reacting to form said product, permitting a precipitate of said sodium sesquicarbonate to form, maintaining said precipitate in contact with the said vehicle until said precipitate has acquired a desired density and crystalline structure, withdrawing small portions of said vehicle containing the desired precipitate, and removing said precipitate from said portion of the vehicle.

8. The process for the continuous production of sodium sesquicarbonate which comprises establishing a main body composed of a solution saturated with respect to sodium sesquicarbonate as a vehicle for the production of said substance, adding, in a substantially continuous manner, and in proportions corresponding to the composition of sodium sesquicarbonate, materials capable of reacting to form said product, permitting a precipitate of said sodium sesquicarbonate to form, maintaining said precipitate in contact with the said vehicle until said precipitate has acquired a desired density and crystalline structure, withdrawing relatively small portions of said vehicle containing the desired precipitate, and removing said precipitate from said portion of the vehicle, and returning the thus treated portion of the vehicle to the main body of the vehicle.

9. The process for the continuous production of sodium sesquicarbonate which comprises establishing a main body composed of a solution saturated with respect to sodium sesquicarbonate as a vehicle for the production of said substance, adding, in a substantially continuous manner, and in proportions corresponding to the composition of sodium sesquicarbonate, materials capable of reacting to form said product, permitting a precipitate of said sodium sesquicarbonate to form, maintaining said precipitate in contact with the said vehicle until said precipitate has acquired a desired density and crystalline structure, keeping a concentration of sodium chloride in said solution conducive to the formation of the desired precipitate, agitating said solution throughout the operation, holding the temperature of said solution at about 60° C., withdrawing relatively small portions of said solution containing the desired precipitate, filtering said precipitate from said solution, and returning the filtrate to the original solution.

10. In the process of producing sodium sesquicarbonate by adding to a saturated solution of sesquicarbonate, and in proportions corresponding to the composition of sesquicarbonate, materials capable of reacting to form said product, the step which comprises maintaining the precipitate of sesquicarbonate in contact with the solution from which it was precipitated until said precipitate has acquired a predetermined density.

In testimony whereof we have hereunto set our hands.

CARL SUNDSTORM.
GEORGE N. TERZIEV.